United States Patent [19]
Barker

[11] Patent Number: 5,279,277
[45] Date of Patent: Jan. 18, 1994

[54] HEAT RADIATING ELEMENT AND DRIPPINGS SHIELD FOR GAS-FIRED BARBECUES

[76] Inventor: Gordon R. Barker, 5891 Broadway Road, Nanaimo, British Columbia, Canada, V9V 1E5

[21] Appl. No.: 923,552

[22] Filed: Aug. 3, 1992

[51] Int. Cl.$^5$ ............................................. A47J 37/00
[52] U.S. Cl. ............................... 126/41 R; 126/25 R; 99/444
[58] Field of Search ............... 126/41 R, 41 A, 41 B, 41 C, 41 D, 25 R, 39 M, 99/645, 447,

[56] References Cited

U.S. PATENT DOCUMENTS

| | | | |
|---|---|---|---|
| 3,224,362 | 12/1965 | Kozar | 126/25 R |
| 3,267,924 | 8/1966 | Payne | 126/41 |
| 3,742,838 | 7/1973 | Luschen et al. | 126/25 R X |
| 4,554,864 | 11/1965 | Smith et al. | 126/25 R X |
| 5,009,151 | 4/1991 | Hungerford | 126/39 M |

Primary Examiner—Larry Jones
Attorney, Agent, or Firm—Barriger & Oyen

[57] ABSTRACT

The present invention provides a heat radiating shield which both prevents the dripping of grease onto the gas burners of the barbecue and provides an even transfer of heat to the cooking area. The invention comprises a smoothly curved, upwardly concave tray which is positioned between the burners and the food-supporting grate. Drippings are trapped in the tray and are not permitted to run out of the tray.

9 Claims, 5 Drawing Sheets

HEAT RADIATING ELEMENT AND DRIPPINGS SHIELD FOR GAS-FIRED BARBECUES

TECHNICAL FIELD

The invention relates to gas-fired barbecues, and more particularly to means for transferring heat between the gas burner and the cooking grill, while reducing flare-ups.

BACKGROUND ART

Gas-fired barbecues, which grill food, particularly meat, using a propane-fuelled burner to heat a layer of lava rocks beneath the food-supporting grill, have universally replaced the charcoal barbecue as the preferred form of outdoor cooking. Lava rock has been preferred as the heat transferring medium since it simulates the effect of charcoal briquettes in that grease dripping off the cooking meat flares up when it strikes the hot rocks, imparting a desired smoked flavour to the meat. However the use of lava rock also carries with it certain disadvantages. Since the lava rocks are porous and irregular, they do not transfer heat efficiently or evenly to the food being grilled, and therefore such barbecues are not fuel efficient. Grease accumulates in the pores of the lava rocks and flares up, burning the meat. To avoid burning the meat, therefore, the lid of the barbecue is left open to reduce the internal temperature, but causing greater heat loss. Grease drippings penetrate through to the gas burners, causing corrosion and reducing the life of the burners. There may also be a safety problem in that grease is able to leak through to the burner area or even the vicinity the propane tank, accumulates and may ignite. A further problem with lava rock is that it must be replaced periodically, and is difficult to dispose of.

Various attempts have been made to solve the foregoing problems with lava rock. U.S. Pat. No. 4,276,869, Kern, discloses a solid ceramic slab which is positioned between the burner and the food-supporting grate. The slab simulates a bed of coals or briquettes and catches the grease drippings and prevents them from flowing over the edges of the slab. U.S. Pat. No. 4,403,597, Miller, discloses a solid cast iron plate which is positioned between the burner and the food-supporting grate. The plate also simulates a lava bed or charcoal and catches the grease drippings but permits the grease to flow through apertures in the plate onto the burners.

U.S. Pat. No. 4,683,867, Beatty, discloses a gas-fired barbecue which utilizes two rectangular metal plates positioned between the burner and the food-supporting grate to prevent the pooling of grease which might cause a fire. The two plates are overlapping and inclined outwardly at a sufficient angle to cause the grease to flow quickly to flanges at the outside edges of the housing and then off the corners of the plates into circular depressions and a drainage channel which carries the grease to a collecting cup or can. Since the grease still collects at various points within the barbecue, the safety problem is still not overcome by this design.

U.S. Pat. No. 4,773,319, Holland, discloses a barbecue grill which includes a grease collection and drainage system which is positioned between the food-supporting grate and a heat deflector plate above the burner. The grease collector has an inclined central channel which carries the grease to a drainage conduit and then out of the enclosure. Finally, U.S. Pat. No. 5,111,803, Barker et al., discloses a flare reduction buffer, which is a solid cast iron plate which is positioned between the burner and the food-supporting grate. The plate has an array of pockets which are provided with perforations which permit the flow of air and block most food drippings but permit some grease to flow through the plate onto the burners.

DISCLOSURE OF INVENTION

The present invention provides a heat radiating shield which both prevents the dripping of grease onto the gas burners of the barbecue and provides an even transfer of heat to the cooking area. The invention comprises a smoothly curved, upwardly concave tray which is positioned between the burners and the food-supporting grate. Drippings are trapped in the tray and are not permitted to run out of the tray, but rather are burned off by the tray.

BRIEF DESCRIPTION OF DRAWINGS

In drawings which disclose a preferred embodiment of the invention.

BEST MODE(S) FOR CARRYING OUT THE INVENTION

Figure 1:
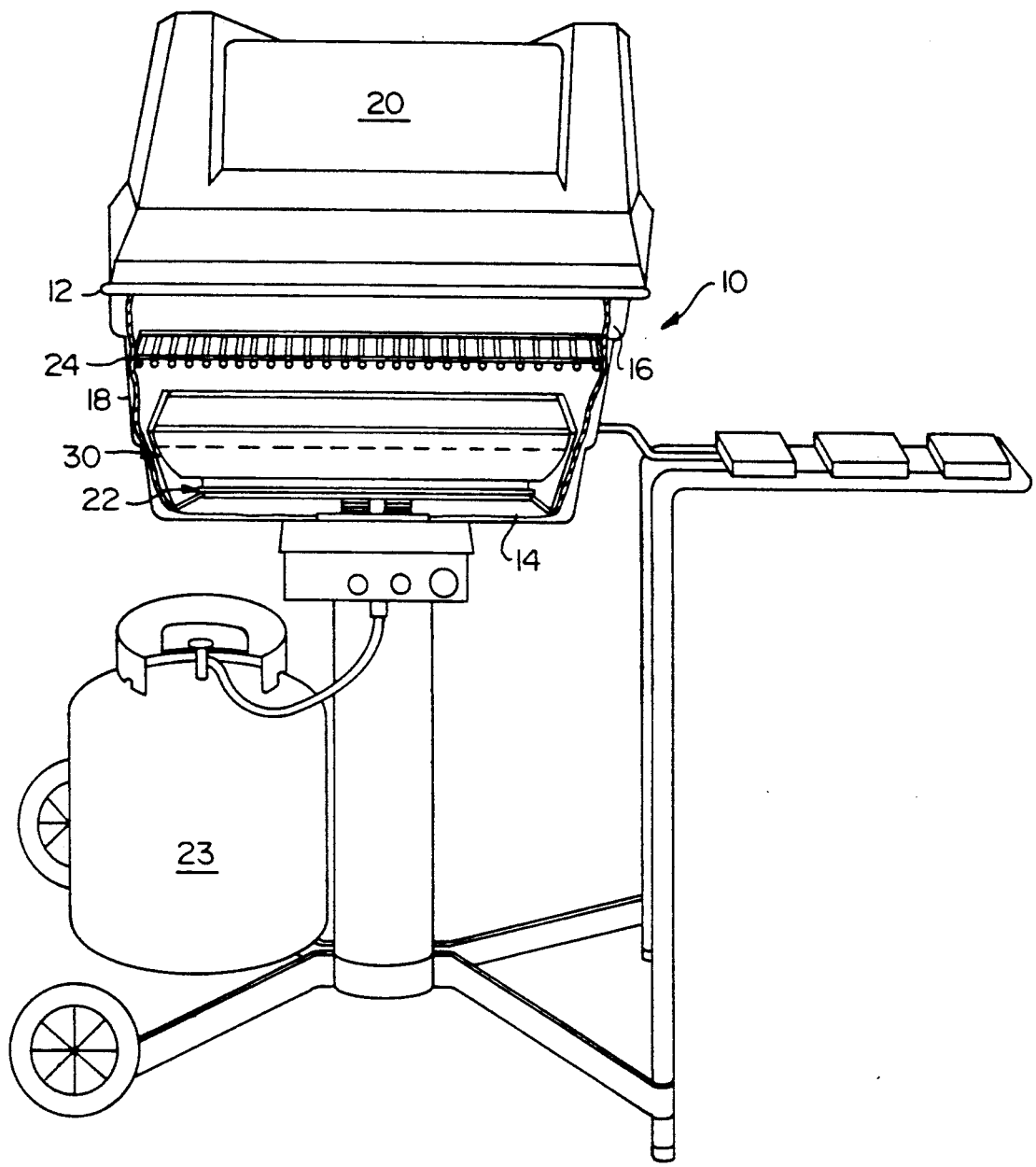
FIG. 1 is a perspective view of a standard gas-fired barbecue, with the front of the housing cut away to reveal the invention.
Figure 2:
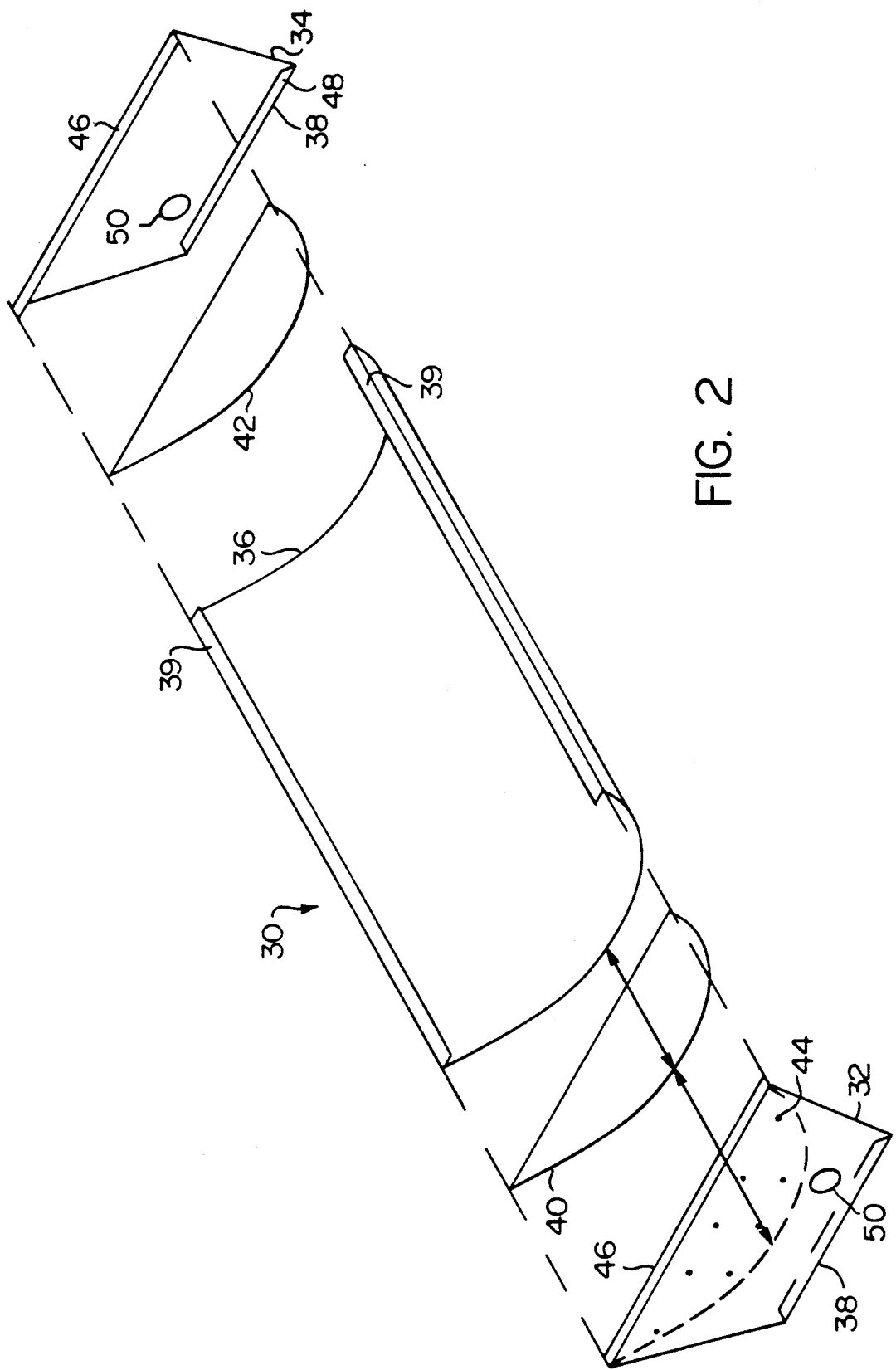
FIG. 2 is a perspective, exploded view of the heat radiating element and drippings shield of the invention.
Figure 3:
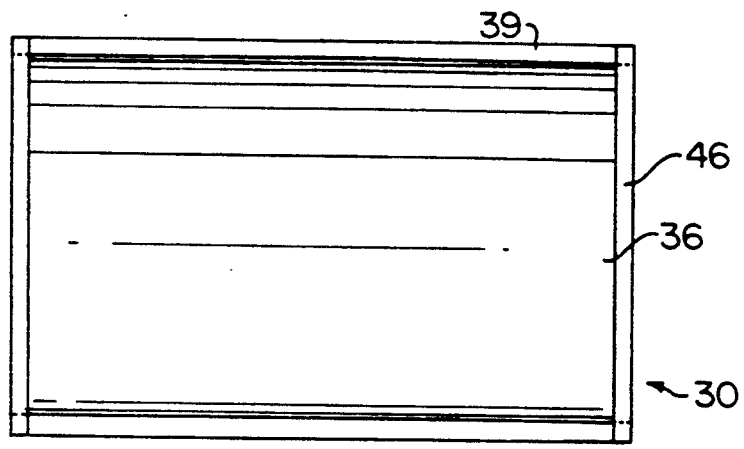
FIG. 3 is a top view of the heat radiating element and drippings shield of the invention.
Figure 4:
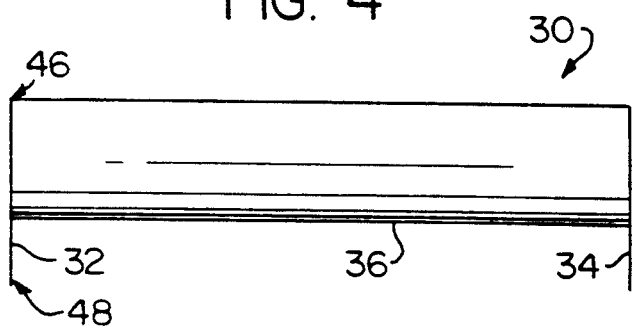
FIG. 4 is a front view of the heat radiating element and drippings shield of the invention.
Figure 5:
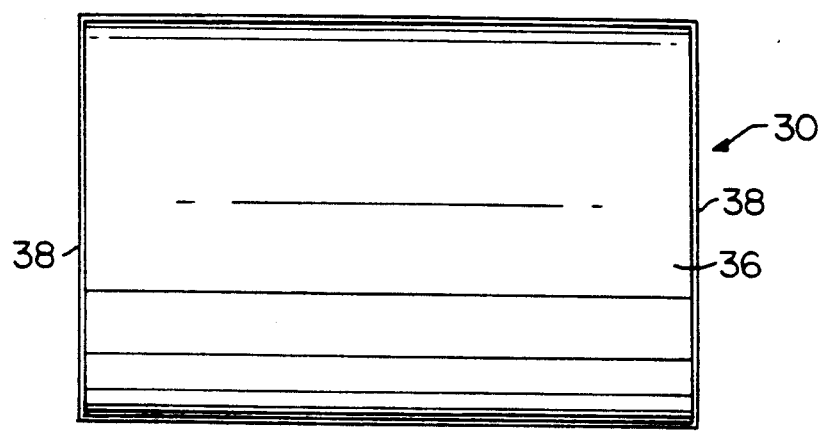
FIG. 5 is a bottom view of the heat radiating element and drippings shield of the invention.
Figure 6:
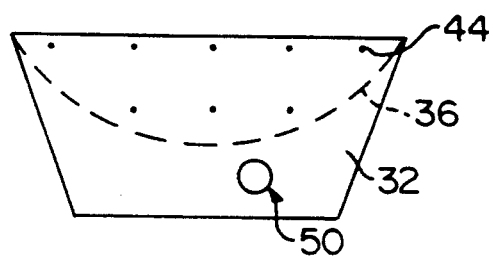
FIG. 6 is a left side view of the heat radiating element and drippings shield of the invention.

With reference to the drawings, a gas-fired barbecue, shown by reference numeral 10, has a housing 12 with bottom 14, side walls 16, end walls 18 and hinged cover 20. A gas burner unit 22 is located above the bottom 14, and is supplied with propane from tank 23. A food-supporting grate 24 is supported horizontally in the upper portion of housing 12.

The heat radiating element and drippings shield of the invention is designated by numeral 30. It has leg end plates 32, 34 and a central curved pan 36. It sits with the bottom edge 38 of leg plates 32, 34 resting on bottom 12 of the barbecue housing, so that the lowest point of pan 36 sits approximately ¼ inch to ½ inch above burner 22. For best results, the flames from burner 22 will contact the underside of pan 36 during cooking. Preferably the cooking grill sits about ½ inch to 1 inch above the upper edge 39 of the device 30.

Figure 7:
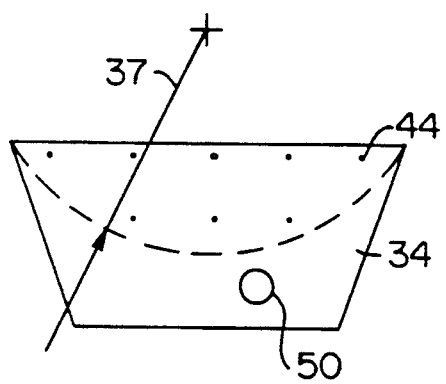
FIG. 7 is a right side view of the heat radiating element and drippings shield of the invention.

The heat radiating element of the invention is preferably manufactured from a 316 stainless steel of 20 gauge, and which forms a shiny surface. It is constructed by welding, by a continuous seam stainless steel weld, end pieces 40, 42 to the concave pan 36, which has horizontal ½ inch flanges 39 for added rigidity. The preferred radius of curvature 37 (FIG. 7) of the surface of pan 36 is approximately 6 and ⅛ inches, with the curve forming a 120 degree arc of the circle. End pieces 40, 42 are then spot welded by stainless steel spot welds 44 to end leg plates 32, 34. End leg plates 32, 34 also are provided with a ½ inch horizontal flange 46, and a ½ inch folded hem 48 along bottom edge 38 for added strength.

The invention may be retrofitted to existing barbecues. The upper edge of pan 36 will typically be 12 inches across but its length will vary depending upon the barbecue in which it is to be used. Common lengths will be at various increments between 10 and 40 inches. One or more ports 50 are provided, each about ¼ inch in diameter, to allow a match to be inserted through the end of the barbecue to light the burner. Although one port 50 is shown in each end leg plate 32, 34, three or more such ports could be provided in each leg plate, with knock-out inserts so that the user could select the appropriate port to open for the user's particular barbecue.

Figure 8:
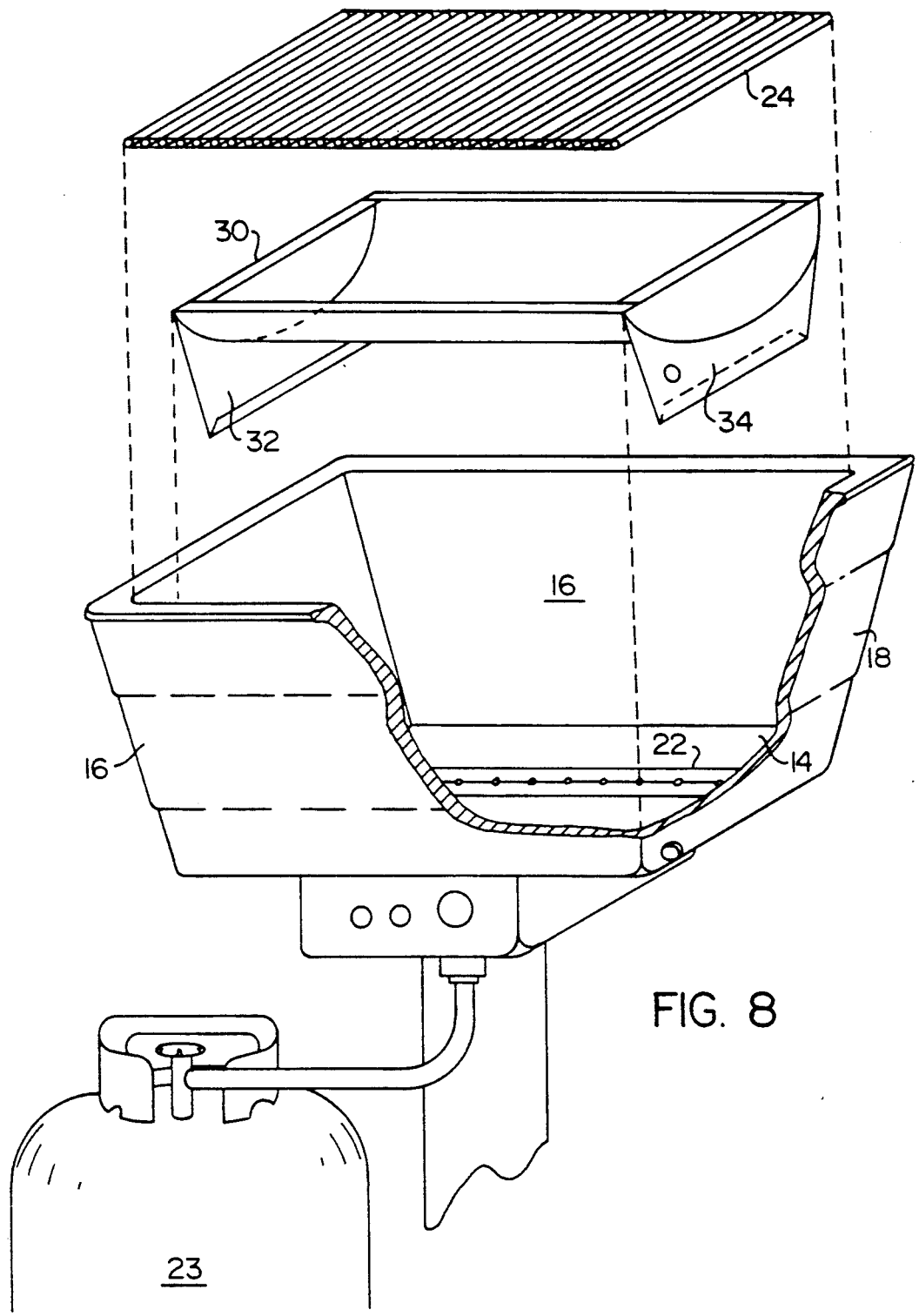
FIG. 8 is an exploded perspective view of a standard gas-fired barbecue, partly cut away, showing the installation of the invention.

To install the invention on an existing barbecue, as shown in FIG. 8, the cooking grill 24 is removed. The lava rocks and the lava rock supporting grill are also removed. The heat radiating element and drippings shield 30 of the invention is then placed on its leg end plates 32, 34 on the bottom 14 of the barbecue housing, above the burner 22, with the concave side up. The cooking grill 24 is then replaced and the barbecue is ready for use. Generally, because there is less occurrence of flare-ups, the barbecue can now be used with the cover closed, at a lower heat setting, resulting in greater fuel efficiency, more even cooking and less shrinkage. While most drippings will vaporize on striking the hot pan 36, and this vapour will cause the meat being cooked to remain more moist with less shrinkage, some of the drippings remain on the tray 36 and solidify on cooling, so periodic cleaning of the invention will keep it at maximum effectiveness. Cleaning is facilitated by the smooth, seamless inner surface. The invention may also be used as a smoker by sprinkling a small amount of water in pan 36 as well as the hickory or other wood chips. By operating the barbecue at low to medium heat at all times, fuel consumption is reduced and the risk of flare-up is reduced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a gas-fired barbecue having a gas burner and a food-supporting grate supported above said burner, the improvement comprising a heat radiating element and drippings shield mounted between said burner and said food-supporting grate, said heat radiating element and drippings shield comprising an upwardly concave, heat-conductive, curved metal pan extending between said burner and said grate across substantially the entire space in said barbecue above said burner between said grate and said burner, said metal pan having a lower surface in direct heat-exchanging communication with said burner.

2. The improvement of claim 1 wherein said barbecue does not include a lava rock bed.

3. The improvement of claim 1 wherein said metal pan forms an arc of a circle.

4. The improvement of claim 3 wherein said arc is a 120 degree arc of a circle.

5. The improvement of claim 1 wherein said metal pan is supported above and in close proximity to said burner by legs at either end thereof.

6. The improvement of claim 5 wherein said metal pan is supported approximately ¼" above said burner.

7. The improvement of claim 1 wherein said metal pan is formed of stainless steel.

8. The improvement of claim 1 wherein the edges of said metal pan are raised in relation to the central area of said pan, and the upper surface of said pan is free of apertures which would permit drainage of liquid from said upper surface, said pan thereby forming a liquid-retaining bowl.

9. A method of cooking using a gas-fired barbecue having a gas burner, a lava rock bed above said burner and a food-supporting grate supported above said lava rock bed, comprising the steps of:
 a) removing said lava rock bed;
 b) replacing said lava rock bed with a heat radiating element and drippings shield mounted between said burner and said food-supporting grate, said heat radiating element and drippings shield comprising an upwardly concave, heat-conductive, curved metal pan extending between said burner and said grate, thereby placing said metal pan in direct heat-exchanging communication with said burner; and
 c) igniting said gas burner to heat said barbecue to an appropriate cooking temperature.

* * * * *